United States Patent [19]
Yoshino et al.

[11] Patent Number: 4,461,560
[45] Date of Patent: Jul. 24, 1984

[54] PHOTOGRAPHIC INFORMATION DISPLAY DEVICE

[75] Inventors: Tsunemi Yoshino; Hiroshi Iwata; Toshitsugu Kashihara, all of Nara; Akitoshi Morioka, Osaka, all of Japan

[73] Assignee: West Electric Co., Ltd., Osaka, Japan

[21] Appl. No.: 326,111

[22] Filed: Nov. 30, 1981

[30] Foreign Application Priority Data

Dec. 2, 1980 [JP] Japan .................................. 55-169816
Mar. 3, 1981 [JP] Japan .................................. 56-30735

[51] Int. Cl.$^3$ ............................................. G03B 17/18
[52] U.S. Cl. .................................... 354/475; 354/217; 354/219
[58] Field of Search ................. 354/53, 105, 109, 154, 354/219, 289, 217

[56] References Cited
U.S. PATENT DOCUMENTS 4,279,481  7/1981  Ishibashi et al. ...................... 354/53
4,286,849  9/1981  Uchidoi et al. ...................... 354/289
4,297,011 10/1981  Adams, Jr. ........................... 354/289

Primary Examiner—Russell E. Adams
Attorney, Agent, or Firm—Burgess, Ryan & Wayne

[57] ABSTRACT

So far, the windows for displaying the number of frames exposed, a film speed, an aperture, a shutter speed and the like have been located at various positions on a camera body, but according to the present invention such photographic information can be displayed at the same place in the vicinity of a viewfinder or in the field of view thereof by a display device comprising an electro-optical display unit and a display information selection means adapted to cause the display unit to display the desired information.

2 Claims, 10 Drawing Figures

PHOTOGRAPHIC INFORMATION DISPLAY DEVICE

BACKGROUND OF THE INVENTION

The present invention relates to a device capable of displaying information associated with photographic operations.

For optimum exposures, various photographic information such as a film speed, an aperture selected, a shutter speed selected and the number of frames exposed is needed to be displayed, but in general a selected aperture is displayed on the lens barrel while a selected shutter speed and the number of exposures made are displayed on the top or back of a camera body. This means that one must seek photographic information at various positions, which is inconvenient and cumbersome.

In order to overcome such difficulties, there has been proposed and demonstrated an electro-optical display device using light-emitting diodes and/or a liquid-crystal display device which permits one to view photographic information within the field of view of a viewfinder. Various cameras incorporating such photographic information display devices are available on the market.

However, in order to mount such display devices in camera bodies, a relatively large space is needed. As a result, the field of view of a viewfinder is reduced, so that photographic information such as a subject to be photographed, an angle of view, focusing and the like which must be conveyed through the viewfinder is adversely affected. In addition, there is a problem that one only cares about the information associated with a subject and forgets to confirm photographic or exposure information such as a shutter speed and so on, so that exposure failure results.

OBJECTS AND SUMMARY OF THE INVENTION

One of the objects of the present invention is, therefore, to overcome the above-described problems.

Another object of the present invention is to provide an information display device which can efficiently display various photographic information.

A further object of the present invention is to provide a photographic information display device which uses a least number of light-emitting diodes and/or liquid-crystal display devices so that numerical photographic information can be displayed with a least number of digits, whereby cumbersome steps for seeking required photographic information at various positions or through various windows can be eliminated and only the desired information can be displayed so as to eliminate misreading of information.

A still further object of the present invention is to provide a photographic information display device in which a liquid-crystal display device is disposed in the vicinity of a viewfinder that is, on the viewing side thereof including its viewing window so that photographic information and warning signals can be displayed efficiently.

According to one embodiment of the present invention, a photographic information display device comprises an electro-optical display unit for displaying various photographic informations such as the number of frames exposed, a selected shutter speed, a selected aperture, a speed of a film loaded and so on and an electronic control circuit for controlling the display of information by the display unit. The display unit is disposed in the vicinity of a viewfinder as described previously or so disposed as to be viewed in the field of view of the viewfinder so that one can confirm the desired photographic information at a glance without seeking it from one to another position.

BRIEF DESCRIPTION OF THE DRAWINGS

Same reference numerals are used to designate similar parts throughout the figures.

DESCRIPTION OF THE PREFERRED EMBODIMENTS

Figure 1:
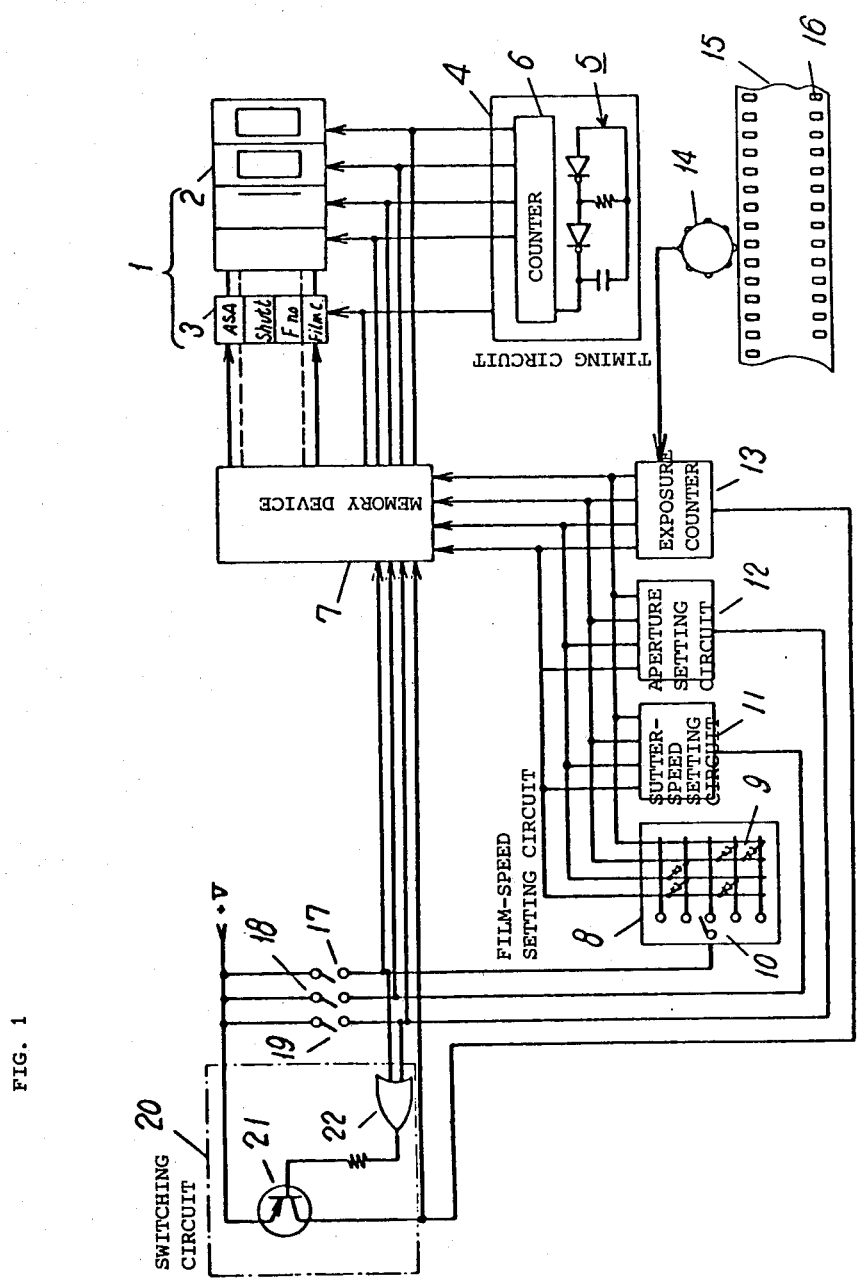
FIG. 1 is an electronic circuit diagram of a first embodiment of the present invention.

FIG. 1 shows a first embodiment of the present invention. A display device generally designated by the reference numeral 1 comprises five display elements which are divided into an array 2 which comprises four display elements and displays a decimal number such as a shutter speed selected or a film speed of a film loaded as will be described in detail below and a "unit" display unit 3 which comprises one display element and identifies the unit of the numeral being displayed by the array 2 which is referred to as "the decimal display unit" in this specification. In order to reduce control terminals to a minimum number, a time-division system is employed to control the display device 1.

Each of the display units comprises electro-optical means such as light-emitting diodes or a liquid crystal display (LCD). In the first embodiment, each of the display elements or arrays in the decimal display unit 2 is made up of eight light-emitting diode segments and the "unit" display unit 3 uses a liquid crystal display.

A timing circuit 4 comprises a free-running or astable multivibrator 5 and a counter 6. The counter 6 counts the output signal of a predetermined frequency from the astable multivibrator 5 and delivers time-divisioned output signals to the display elements or arrays in the decimal display unit 2.

A storage or memory device 7 stores coded data representative of a film speed, a shutter speed, an aperture, the number of frames of a film loaded and so on.

A film-speed setting circuit 8 comprises a matrix encoder 9 and a switch 10. Depending upon the speed of a film loaded, the switch 10 is made into contact with a predetermined one of a plurality of input terminals of the matrix encoder 9 so that the coded output signal representative of the film speed is transmitted to the memory or storage device 7. The switch 10 is operatively connected to an ASA film-speed setting dial (not shown) for movement in unison therewith. That is, when the film speed is set by rotating the ASA film-speed setting dial, the switch 10 is automatically operated to make into engagement with a predetermined input terminal of the matrix encoder 9.

A shutter-speed setting circuit 11 and an aperture setting circuit 12 are substantially similar both in construction and operation to the film-speed setting circuit 8 so that no further description thereof shall be made.

An exposure counter 13 is of the conventional type which counts the number of exposures made in terms of the rotation of a sprocket wheel 14 which engages with the perforations 16 of a film 15 and is rotated through predetermined number of perforations as the film 15 is advanced as is well known in the art. The exposure counter 13, therefore, delivers an encoded output signal representative of the number of exposures made to the memory or storage device 7.

The power is supplied through switches 17, 18 and 19, respectively, to the film-speed setting circuit 8, the shutter-speed setting circuit 11 and the aperture setting circuit 12. These switches 17, 18 and 19 are so arranged that when one of them is closed, an information stored in the memory or storage device 7 is read out.

A switching circuit 20 comprises a switching element or a transistor 21 and an OR gate 22 and is used in conjunction with the display of the number of exposures made. When the transistor 21 is driven into the conduction state, the power is supplied to the exposure counter 13. When one of the switches 17, 18 and 19 is closed, the transistor 21 is driven into the nonconduction state.

Normally the number of exposures made is being displayed, but any other information can be normally displayed if one of the switches 17, 18 and 19 is arranged just like the switching circuit 20.

Next, the mode of operation of the first embodiment with the above-described construction will be described in detail. A film is loaded and then an on-off switch (not shown) is closed. When the switches 17, 18 and 19 remain opened, the output from the OR gate 22 is at a low level, so that the transistor 21 is turned on so that the power is supplied to the exposure counter 13 which in turn delivers the output signal representative of the number of exposures made to the memory or storage device 7. Then, in response to the output or scanning signal from the timing circuit 4, the "unit" display unit 3 displays "FILM C" which identifies that the unit of a numeral displayed by the decimal display unit 2 is "the number of exposures already made (or to be permitted). Since the film is not advanced after it has been loaded, the decimal display unit 2 displays "0". When a film winding lever (not shown) is rotated to advance the film 15 by one frame, the teeth of the sprocket wheel 14 engages with eight perforations 16 and consequently the sprocket wheel 14 is rotated through predetermined number of perforations. The angle of rotation of the sprocket wheel 14 is then detected by the exposure counter 13 and the output signal representative of the first exposure is delivered to the memory or storage device 7 from the exposure counter 13. Then, in response to the output or scanning signal from the timing circuit 4, the decimal display unit 2 displays "1".

Next, the display of the film speed will be described. The switch 17 is closed to supply the power to the film-speed setting circuit 8. Then, the output from the OR gate 22 goes HIGH, so that the transistor 21 is turned off and the supply of power to the exposure counter 13 is interrupted. As a result, no output signal is delivered from the exposure counter 13 to the memory or storage device 7, but the output signal representative of the film speed which is set as described previously is delivered from the film-speed setting circuit 8 to the memory or storage device 7. In response to the output or scanning signal from the timing circuit 4, the display unit 2 displays, for instance, "100" GT1and the "unit" display unit 3 displays "ASA" as shown in FIG. 1. The aperture and the shutter speed can be displayed in a manner substantially similar to that described above in conjunction with the display of the film speed, so that no further description shall be made in this specification.

Figure 2A:
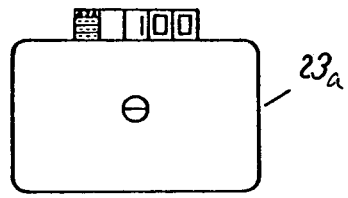
FIG. 2A shows a display device mounted on the top of a camera body.
Figure 2B:
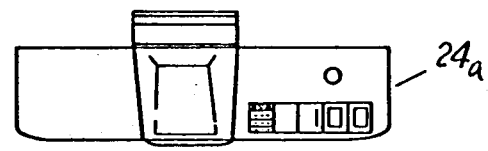
FIG. 2B shows a display device so mounted in a camera body that the displayed information can be viewed through a window formed through the top of the camera body.
Figure 2C:
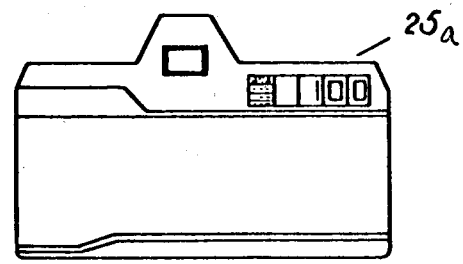
FIG. 2C shows a display device so mounted in a camera body that the displayed information can be viewed through a window formed through the back of the camera body.

The display device 1 can be mounted on a camera body as shown in FIGS. 2A to 2C. It can be mounted directly above a pint plate 23a as shown at FIG. 2A, so that one can view the display device 1 through a viewfinder. Alternatively, it can be so mounted in the camera body that it can be viewed through the top plate 24a of the body as shown at FIG. 2B. In addition, the display device 1 can be so mounted in the camera body that it can be viewed through an aperture or window formed through the rear side wall 25a of the top plate 24a as shown at FIG. 2C.

In summary, according to the first embodiment of the present invention, exposure data or information such as a film speed, a shutter speed, an aperture, the number of exposures made or to be permitted and so on can be displayed by a single display device which has a minimum number of display arrays or elements each comprising light-emitting diodes or a liquid crystal display. As a result, the space for mounting the display device can be reduced to a minimum and cumbersome works for seeking for desired information at various positions on the camera body.

Next, a second embodiment of the present invention will be described. In the second embodiment is used a liquid-crystal display device one of the remarkable advantages of which is a minimum power consumption. As is well known in the art, various patterns can be displayed when a voltage is applied across two transparent electrodes with a sealed-in liquid crystal. A viewing-side electrode is etched or otherwise processed so that pattern-forming segments are formed. In the case of DSM type liquid-crystal display devices, a homogeneous layer of Nematic liquid crystal is held between two transparent electrodes. When no voltage is applied between the transparent electrodes, the display device is transparent, but when a voltage is applied or the Nematic liquid crystal is subjected to an electric field, its molecular pattern is disturbed and turbulence is produced, scattering light. In case of the TN type liquid-crystal display device, a layer of Nematic liquid crystal is held between transparent electrodes so as to form a twist pattern. Polarization plates are overlaid over the transparent electrodes in such a way that their axes of polarization are in parallel with each other or perpendicular to each other. When the liquid crystal is subjected to an electric field, its molecular pattern is so twisted that only a polarized light beam can pass through the device. Either positive or negative display is possible by this device.

Figure 3:
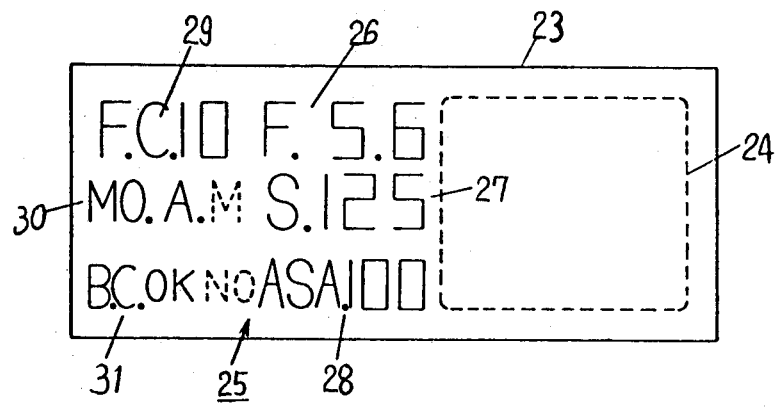
FIG. 3 shows a liquid-crystal display device used in a second embodiment of the present invention.

In FIG. 3 is shown a liquid-crystal exposure data display device 23 including a liquid-crystal viewfinder window 24 indicated by broken lines. The window 24 can be opened or closed by controlling a voltage applied thereto. Various information can be displayed on a display portion generally designated by the reference numeral 25. For instance, an aperture is displayed at 26; a shutter speed, at 27; a film speed, at 28; the number of exposures or exposed frames, at 29; exposure mode, at 30; and the battery condition, at 31.

Figure 4:
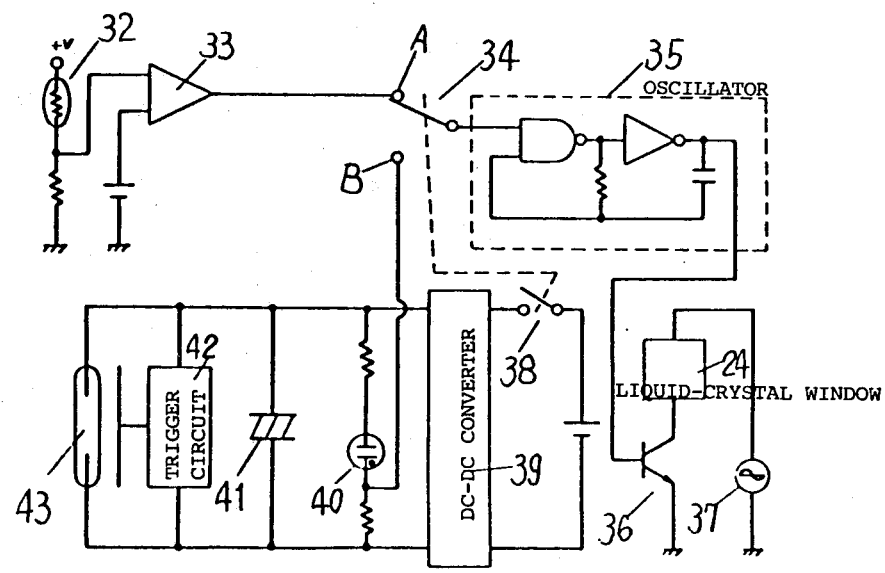
FIG. 4 is a diagram of a circuit for driving a liquid-crystal window in the display device shown in FIG. 3.

The liquid-crystal window 24 of the exposure data display device 23 is controlled by a circuit as shown in FIG. 4 in the case of a camera with a built-in electronic flash device. Reference numeral 32 denotes a photoelectric transducer; 33, a comparator; 34, a switch ganged with an on-off switch 38 in a photoelectronic flash system; 35, an oscillator; 36, a transistor; 37, a power supply; 39, a DC-DC converter; 40, a neon tube for detecting the voltage across a main flash capacitor 41; 42, a trigger circuit; and 43, a flash lamp.

The mode of operation will be described. When the switch 34 closes the contact A, the brightness of a subject is detected by the transducer 32 and the output therefrom is compared with a reference value by the comparator 33. If the brightness of the subject is so low that a flash exposure is needed, the output signal from the comparator 33 activates the oscillator 35 so that the transistor 36 is intermittently turned on and off. As a result, the voltage is intermittently supplied from the power supply 37 to the liquid-crystal window 24, whereby the latter is intermittently opened and closed. Therefore, one immediately notices that a flash exposure is needed or exposure conditions must be varied suitably.

When the switch 34 is switched to close the contact B, the oscillator 35 is connected to one end of the neon tube 40 in the electronic flash device. Since the switch 34 is ganged with the on-off switch 38, the latter is closed so that the DC-DC converter 39 charges the main flash capacitor 41. When the voltage across the main flash capacitor 41 rises to a value sufficient to light the flash lamp 43, the neon tube 40 is turned on so that the oscillator 35 is de-activated. That is, until the voltage across the main flash capacitor 41 rises to a predetermined level, the oscillator 35 remains activated so that the liquid-crystal window 24 is intermittently opened and closed so that an operator can notice that a flash exposure is not ready yet.

Figure 5:
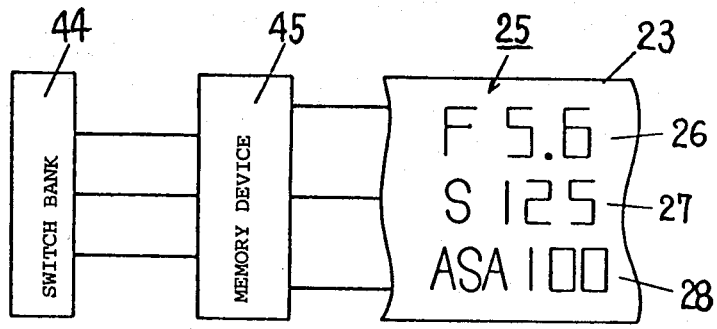
FIGS. 5 and 6 are schematic views used for the explanation of the mode of operation of the second embodiment.

Next, the operation of the liquid-crystal display device 23 will be described with further reference to FIGS. 5 and 6. A switch bank 44 is operatively connected to a shutter-speed setting dial, an aperture setting dial and the like and output signals from the switch bank 44 are stored in a memory or storage device 45 and displayed on the portion 25 of the liquid-crystal display device 23.

Figure 6:
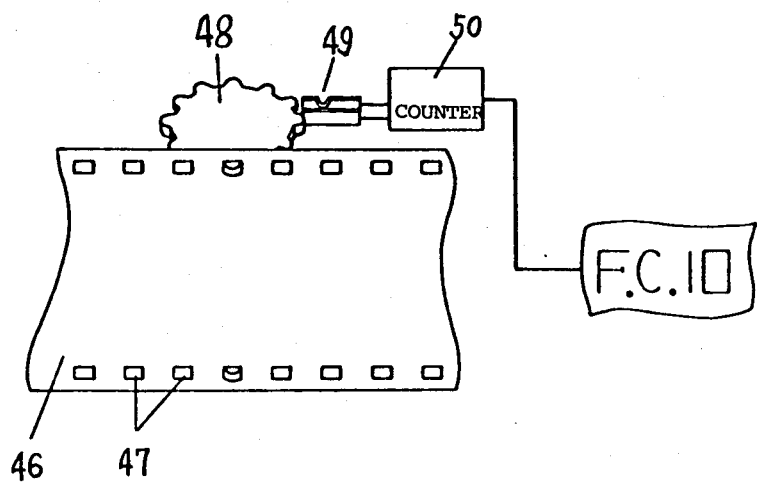

In order to count the number of exposures made, an arrangement as shown in FIG. 6 is used. As a film 46 is advanced, a sprocket wheel 48, whose teeth are engaged with perforations 47 of the film 46, is rotated so that a switch 49 one of the contacts of which is engaged with the sprocket wheel 48 is closed and then opened intermittently. A counter 50 counts how many times the switch 49 is closed and the contents of the counter 50; that is, the number of exposures made is displayed.

Other exposure data such as an exposure mode, the condition of a battery and so on are detected by conventional switching and detecting means and displayed.

Figure 7:
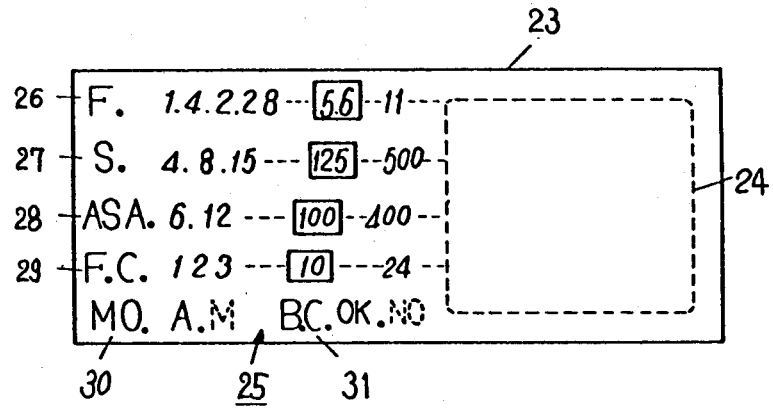
FIG. 7 shows a modification of the display device as shown in FIG. 3.
Figure 8:
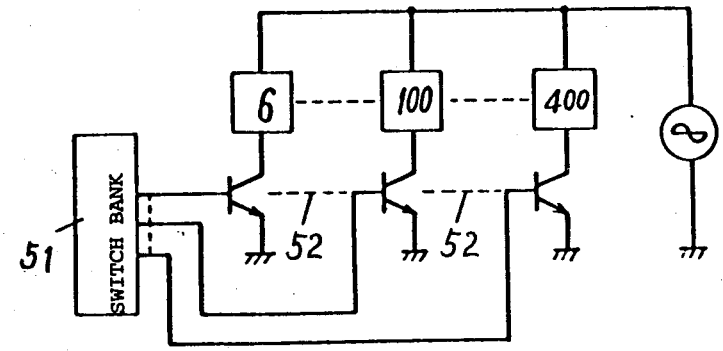
FIG. 8 is a diagram of a circuit for driving the display device shown in FIG. 7.

In FIG. 7 is shown a modification of the display portion 25 of the display device 23. Display windows are arranged like a "level meter" and desired information can be selectively displayed. For the display of a shutter speed, an aperture, a film speed and the number of exposures made, corresponding series of numbers or numerals are stored in the display device 23. As shown in FIG. 8, a switch bank 51 is operatively connected to a shutter-speed setting dial not shown, an aperture setting dial not shown, a film-speed setting dial and an exposure counter not shown. In response to the output signal from the switch bank 51, one of transistors 52 is turned on, so that a desired display window is connected to a power supply.

The liquid-crystal window 24 is intermittently turned on and off (opened and closed) if the brightness of a subject is so low that a flash exposure is needed as described previously with reference to FIG. 4.

In summary, according to the second embodiment of the present invention, every exposure information can be displayed by a liquid-crystal display device disposed in the vicinity of the viewfinder of a camera, so that one can immediately receive the desired exposure information. In addition, the display of exposure information or data is not adversely affected at all by the light beam passing through the viewfinder. Furthermore, the eyepiece of the viewfinder comprises a liquid-crystal window which can be intermittently opened and closed when exposure conditions are not adequate and consequently exposure failure can be avoided.

What is claimed is:

1. A photographic information display device comprising a plurality of switching means each of which is activated in response to the setting of each of a plurality of photographic information items, a liquid-crystal display device which can store therein said plurality of photographic information items and which is disposed in the vicinity of a view finder of a camera or the like, a power supply which is connected through said plurality of switching means to said liquid-crystal display device, the viewing side of an eyepiece of said viewfinder of a camera or the like being covered with a liquid-crystal window of said liquid-crystal display device, said window being so driven and controlled that when photographic conditions are inadequate, said liquid-crystal window is intermittently opened and closed or remains closed.

2. A photographic information display device for displaying a plurality of photographic information items such as number of exposures made, film speed, aperture and the like, said device comprising:
(a) a display unit for displaying said plurality of photographic information items at the same place;
(b) a photographic information setting means for setting one of said plurality of photographic information items and generating a first electric signal corresponding to the item which is set;
(c) an exposure counter for counting the number of exposures made and generating a second electric signal corresponding thereto;
(d) a memory means for storing said plurality of photographic information items as code data and generating an output signal corresponding to said first or second electric signal when said first or second electric signal has been input to said memory means;

(e) a timing circuit for applying a timing signal to said display device;

(f) a first switching means for activating said photographic information setting means when said first switching means is on and deactivating said photographic information setting means when said first switching means is off;

(g) a second switching means for activating said exposure counter when said second switching means is on and deactivating said exposure counter when said second switching means is off; and (h) a third switching means coupled between said first switching means and said second switching means for switching off said second switching means and switching on said second switching means when said third switching means is off.

* * * * *